3,679,539
       LIGHTWEIGHT BUILDING UNITS
Hubert Gossens, Moers, Jürgen Kammermeier, Krefeld-
  Uerdingen, and Werner Klöker, Krefeld-Bockum, Ger-
  many, assignors to Farbenfabriken Bayer Aktiengesell-
  schaft, Leverkusen, Germany
   No Drawing. Filed Nov. 25, 1970, Ser. No. 92,865
   Claims priority, application Germany, Dec. 13, 1969,
              P 19 62 603.0
         Int. Cl. B32b 5/14, 5/20; B29d 27/00
U.S. Cl. 161—159                               6 Claims

ABSTRACT OF THE DISCLOSURE

Lightweight building units, especially lightweight slabs of synthetic resin rigid foam having a granular surface with exposed aggregates which is synthetic resin-bonded and resembles washed concrete.
   The lightweight building units may be optionally fibre-reinforced and/or contain lightweight fillers.

The subject of the invention are lightweight building units, especially lightweight slabs of rigid synthetic resin foam which is optionally fibre-reinforced and/or contains lightweight fillers, the units being characterised in that they possess a surface structure which is also synthetic resin-bonded and which resembles washed concrete, and also a process for their manufacture.
   Cement-bonded building units, especially building slabs, with a surface structure resembling washed concrete are known. They mainly serve decorative purposes such as, for example, as balustrade slabs, wall coverings and curtain facades, frequently without exerting a static function for the building, so that stable support constructions are needed. Because of their high density, which is about 2.4 tons per cubic metre, the transport costs and assembly costs are high. Furthermore, these building units absorb up to 10 percent by volume of water, or even more, in a moist environment, and as a result their heat conductivity, which is in any case high, is increased yet further. In many cases this demands additional heat insulation, for example by applying heat insulating layers, for example foam slabs or fibre slabs, which in turn however possess an even lower mechanical strength. For this reason, sandwich units are frequently necessary, consisting of a cement washed concrete surface slab, a heat insulating layer and a rear face of a material of higher strength, for example cement concrete slabs or asbestos cement slabs. Because of the low strength of the heat insulating layer the use of metal anchoring devices, which connect the two covering slabs to one another whilst passing through the heat insulating layer, is frequently unavoidable. Such metal anchoring devices however form heat bridges and reduce the heat insulating action of the sandwich units.
   The new lightweight building units are free of these disadvantages. They combine the decorative appearance of the outer layer with a comparatively low density and hence a good heat insulating action, absorb practically no water through the surface and at the same time possess high strength properties, especially if the synthetic resin rigid foam layer is reinforced by fibres, for example glass fibres, and/or lightweight fillers, such as expanded clay or foam glass beads, so that they can also be used as load-bearing building units. Typical data for the density and strength properties are, for example: density about 0.5 to about 1 ton per cubic metre and, depending on the nature and amount of the fillers and of the foam material, compressive strength about 6 to about 100 kp./cm.$^2$, flexural strength up to about 40 kp./cm.$^2$, and E-moduli of about 6,000 to about 14,000 kp./cm.$^2$.

If open-pore foams and fillers are used, breathing building units can be manufactured. Furthermore, no efflorescences and haze manifest themselves on weathering, as is the case with cement concrete building units.
   The preferred process for the manufacture of cement-washed concrete slabs is the so-called "sand bed process." The bottom of the box-like mould is first covered with a layer of sand. The water-wetted coarse aggregate, for example gravel and/or marble chips and/or quartz chips and/or other stone chips, generally of differing particle size, are placed on top of this and the mould is vibrated until the coarse aggregate touches the bottom of the mould. In this process, the thickness of the sand bed should be about ⅓ of the average diameter of the coarse aggregate. A layer of cement mortar is then applied, which should cover the layer of coarse aggregate to a height of about 1 cm. Before the mortar has set, the core concrete layer is finally introduced into the mould, into which reinforcements are set if appropriate.
   Normally, it is only after some days that such a building slab has hardened to the point that it can be removed from the mould and transported. It only reaches its full strength after about 28 days. After hardening and removal from the mould, the sand which has not been bonded by the cement is blown out, washed out or brushed out of the previous underside of the slab, whereby the washed concrete surface structure is produced.
   The process according to the invention for the manufacture of the new lightweight building units initially described consists, on the other hand, in first introducing coarse aggregate of the type mentioned into a sand bed, and forming a foam backing in a manner which is in itself known, optionally in the presence of fibre material, especially glass fibres and/or lightweight fillers, using a synthetic resin composition which forms a rigid foam and cures without external application of heat being necessary, removing the material from the mould after the foam has cured, and mechanically removing the non-bonded sand between the coarse aggregate.
   Since the foaming and curing of the plastics compositions always only demands a few minutes, the building units can already be removed from the mould, and finished, after a very short time.
   This simple process is only possible because, as has surprisingly been found, the foamable plastics composition does not form a foam at the points of contact with the sand bed, or that foam first formed very rapidly collapses again, so that a firm bond between the inner layer of sand and the coarse aggregate on the one hand, and the plastics composition and the rigid foam core on the other, is produced. This compact layer, resembling a synthetic resin mortar, is generally about 1 to about 5 mm. thick.
   Instead of the customary sand for the sand bed, quartz powder, marble powder, dolomite powder or some other powdered stone or kaolin or glass powder can optionally also be used. Ground plastics, for example polyester resins, epoxide resins or polyurethane resins, are also suitable.
   The particle size of the sand bed material can, as in the case of cement wash concrete, be suited to the desired effects. It is generally between about 0.1 and about 1 mm., but can also be chosen to be less or greater.
   As in the case of cement washed concrete, the appearance of the surface is however largely determined by the coarse aggregate, for example gravel, stone chips, marble chips and/or broken glass, and by its particle size. The latter can be a few millimetres to several centimetres. The coarse material can optionally first be coated with a thin layer of synthetic resin.
   Possible synthetic resin compositions which can be cured without external application of heat and can be foamed are, for example: unsaturated polyester resin compositions, such as are for example described in French patent specifications Nos. 1,535,795 and 1,535,796, and also polyurethane rigid foam compositions, foamable phenolic resins and methacrylate resins and similar curable monomers, oligomers and polymers containing polymerisable groups, as well as silicones, polysulphides and polythiol compounds.

The foamable plastics composition is advantageously adjusted in such a way that the density of the corresponding rigid foam is, without the above mentioned additions, above about 30 kg. per cubic metre, appropriately between about 60 and about 500 kg./m.$^3$ and with the above mentioned additions between about 150 and 1200 kg. per cubic metre.

The fibres are appropriately already mixed into the synthetic resin composition before introduction into the mould. Fibre mats and fibre fabrics can also first be laid on top of the layer initially introduced.

The bond between the decorative outer layer and the foam or foam-lightweight concrete can be strengthened if cut glass fibre rovings, dry or wetted with reactive resin, are sprayed onto the sand bed, or if an endless roving in loop form or a fibre fleece, a fabric or a mat is applied and locally bonded to the material first introduced by the reactive resin which has been sprayed on beforehand or is sprayed on subsequently. The fibres or loops then extend into the foam or foam-lightweight concrete and lead to an additionally effective mechanical bond.

It is particularly advantageous to cover the coarse aggregate layer and sand bed layer with lightweight fillers, for example expanded clay or foam glass beads, and to fill the space which is to contain the foam therewith, in a manner which is in itself known. The synthetic resin composition which is to be foamed is then poured into the cavities between these beads.

In general it is advisable to carry out the foaming in a closed mould.

Before backing the coarse aggregate layer and sand bed layer with foam, these layers can optionally be sprayed with a cold-curing reactive resin, and in particular with such an amount that about 1 to 3 mm. of the sand bed is impregnated therewith. After the resin has gelled, it is back-filled with lightweight fillers and a lid, for example a gypsum board or an asbestos cement slab or glass fibre-reinforced plastics slab, is placed on top. The mould can then be set up vertically so that the previous base plate forms a side plate, and can be filled with foam after closing the mould on the top narrow side. A type of sandwich is produced in this way, but the core of the slab and the washed concrete surface form one unit, and the rear face is foamed.

Special effects can be achieved by colouring or pigmenting the sand, the coarse aggregate material and/or the synthetic resin.

EXAMPLE

A mould which can be taken apart, with internal dimensions of 100 x 80 x 7.5 cm. and made of multi-ply plywood (about 30–40 mm. thick), is rubbed on the inside with floor wax as a release agent, and is assembled horizontally (flat), apart from the lid. The bottom of the mould is filled with an approximately 1 cm. thick layer of a dry quartz sand, type M3. 16 kg. of dry Rhine gravel of particle size 15–30 mm. are sprinkled thereon as uniformly as possible. The gravel is lightly pressed, or vibrated, into the sand. Care must be taken that the gravel sticks in the quartz sand to as nearly as possible the same depth everywhere. The remainder of the mould is filled with an expanded glass of particle size 15–30 mm. About 5,900 g. of a foamable polyester resin mixture, including blowing agent and peroxide catalyst, as described in French patent specification 1,535,795, are then uniformly distributed in the cavities between the gravel. The mould is closed with a lid provided with several holes of about 10 mm. size. After a few minutes, the interspaces fill with polyester foam. After about 30 minutes, the foam has cured. The moulding is appropriately left for a further 30 minutes in the mould, before ejection. The loose, dry, non-bonded sand on the lower, exposed, concrete surface is finally removed with compressed air or water.

A corresponding process can be followed using a binder mixture which yields a polyurethane foam or a phenolic resin foam.

What we claim is:

1. A lightweight building unit comprising a shaped synthetic resin foam unit having a decorative surface comprising a coarse aggregate partially imbedded in a surface of said foam unit and thereby bonded thereto and a layer of powdered material adhered to said surface between said aggregate by a non-foamed bonding layer of said synthetic resin.

2. The lightweight building unit of claim 1 wherein said foam unit has a density of 30 to 500 kg. per cubic metre.

3. The lightweight building unit of claim 1 wherein the foam unit has a density of 60 to 500 kg. per cubic metre.

4. The lightweight building unit of claim 1 wherein said synthetic resin is a polyester resin, a polyurethane resin, a phenolic resin or a methacrylate resin.

5. The lightweight building unit of claim 1 containing reinforcing fibres, fillers or both and having a density of 150 to 1200 kg. per cubic metre.

6. The lightweight building unit of claim 1 containing reinforcing glass fibres and having a density of 150 to 1200 kg. per cubic metre.

References Cited

UNITED STATES PATENTS

| 3,492,192 | 1/1970 | Bullard IV | 264—45 |
| 3,555,131 | 1/1971 | Weismann | 161—159 |

WILLIAM J. VAN BALEN, Primary Examiner

U.S. Cl. X.R.

161—160, 162, 164, 168; 264—45